United States Patent
Fortier et al.

(10) Patent No.: US 7,052,665 B2
(45) Date of Patent: May 30, 2006

(54) METHOD OF PREPARING HIGHLY ORDERED MESOPOROUS MOLECULAR SIEVES

(75) Inventors: Luc Fortier, Charlesbourg (CA); Pierre Fournier, Québec (CA); Serge Kaliaguine, Lac Saint-Charles (CA); Do Trong On, Sainte-Foy (CA)

(73) Assignee: Silicycle Inc., Quebec (CA)

( * ) Notice: Subject to any disclaimer, the term of this patent is extended or adjusted under 35 U.S.C. 154(b) by 0 days.

(21) Appl. No.: 10/494,313

(22) PCT Filed: Nov. 1, 2002

(86) PCT No.: PCT/CA02/01682

§ 371 (c)(1),
(2), (4) Date: Sep. 27, 2004

(87) PCT Pub. No.: WO03/037511

PCT Pub. Date: May 8, 2003

(65) Prior Publication Data

US 2005/0031520 A1    Feb. 10, 2005

Related U.S. Application Data

(60) Provisional application No. 60/330,847, filed on Nov. 1, 2001.

(51) Int. Cl.
*C01B 33/26* (2006.01)
*C01B 33/12* (2006.01)
(52) U.S. Cl. .............. 423/328.1; 423/328.2; 423/335; 423/702
(58) Field of Classification Search ............ 423/328.1, 423/328.2, 335, 702
See application file for complete search history.

(56) References Cited

U.S. PATENT DOCUMENTS

| | | | |
|---|---|---|---|
| 3,607,777 A | | 9/1971 | Winyall et al. |
| 4,578,258 A | | 3/1986 | Rieck |
| 5,219,813 A | | 6/1993 | Kumar et al. |
| 5,308,596 A | | 5/1994 | Kotzian et al. |
| 5,308,602 A | | 5/1994 | Calabro |
| 5,622,684 A | | 4/1997 | Pinnavaia |
| 5,785,946 A | | 7/1998 | Pinnavaia et al. |
| 5,840,271 A | | 11/1998 | Carrazza |
| 5,951,962 A | | 9/1999 | Muller et al. |
| 6,054,111 A | * | 4/2000 | Antonietti et al. .......... 423/702 |
| 6,319,486 B1 | * | 11/2001 | Mou et al. ................. 423/702 |
| 6,497,857 B1 | * | 12/2002 | Cheng et al. .............. 423/702 |
| 2002/0160176 A1 | * | 10/2002 | Pinnavaia et al. ....... 428/315.7 |

FOREIGN PATENT DOCUMENTS

EP    0 795 517    9/1997

(Continued)

OTHER PUBLICATIONS

Kim et al. "Synthesis of highly ordered mesoporous silica materials using sodium silicate and amphiphilic block copolymers," Chem Commun, 2000, pp. 1159-1160.*

(Continued)

*Primary Examiner*—David Sample
(74) *Attorney, Agent, or Firm*—Ogilvy Renault LLP

(57) ABSTRACT

Highly ordered mesoporous silica molecular materials are prepared using sodium silicate as a silica source, sulfuric acid and nonionic poly(alkylene oxide) surfactants or nonionic amphiphilic bloc copolymers as structure-directing agents. The mesoporous silica materials obtained have hexagonal and cubic structures, uniform pore size and high surface areas.

8 Claims, 20 Drawing Sheets

FOREIGN PATENT DOCUMENTS

| | | |
|---|---|---|
| EP | 0 935 996 | 8/1999 |
| JP | 2000109312 A * | 4/2000 |
| WO | WO 99 37705 | 2/2000 |
| WO | WO 01 78925 | 10/2001 |

OTHER PUBLICATIONS

Seong-Su Kim et al., Non-ionic surfactant assembly of ordered, very large pore molecular sieve silicas from water soluble silicates, Chem Comm, No. 24, pp. 1161-1162.

* cited by examiner

METHOD OF PREPARING HIGHLY ORDERED MESOPOROUS MOLECULAR SIEVES

TECHNICAL FIELD

The present invention relates to a method of preparing highly ordered mesoporous molecular sieves. More particularly, the invention relates to a method of preparing highly ordered mesoporous silica materials having hexagonal and cubic structures, uniform pore size and high surface areas.

BACKGROUND OF THE INVENTION

Large pore-size molecular sieves are much in demand for reactions or separations involving large molecules since the novel family of mesoporous molecular sieves designated as M41S was discovered by Mobil Corporation scientists. These mesoporous materials, with well-defined pore sizes of 10–100 Å, overcome the pore diameter constraint (<12 Å) of microporous zeolites and offer many new possibilities in the catalytic conversion of large molecules.

The potential of mesoporous molecular sieves as catalysts has been demonstrated in a number of areas, due to the fact that the extremely high specific surface areas are conducive to high catalytic activity. The large pore size allows for the fixation of large active complexes, reduces diffusional restriction of reactants, and enables reactions involving bulky molecules to take place in the pores. The first catalytic studies with mesoporous molecular sieves focused on metal-substituted MCM-41™ materials in which the active species were incorporated into the silicate matrix. The reactions studied were mainly oxidation reactions and acid catalyzed reactions. The next stage of the development of MCM-41™ based catalysts involved the deposition of heteroatoms onto the surface of the mesoporous framework.

Another area where mesoporous materials are beneficial is separation and adsorption. The uniform pore structure within the mesopore range and the resulting high pore volume yields materials for separations that vary from the removal of organic and inorganic contaminants in waste streams to chromatographic media. Functionalized mesoporous materials have been used for the removal of heavy metals from waste streams; for example, MCM-41™ functionalized with a mercaptopropylsilane demonstrated a high affinity to extract mercury and other heavy metals from both aqueous and nonaqueous waste streams. Modification of the pore walls by coating the mesoporous structure can also alter the adsorption and catalysis behaviors of the materials. Coated materials such as a polyethylenimine coated material demonstrated excellent selectivity and high static adsorption capacity in the separation of acidic nucleotides. This static capacity demonstrated by the MCM-41™ material was higher than a comparable coated material prepared with amorphous silica.

Although extensive research efforts have been undertaken to explore the applications of mesoporous silica materials, the synthetic procedures are not as commercially viable as they might be, due to the use of high cost silicon alkoxides such as tetraethyl orthosilicate as silica sources and of hydrochloric acid which is not compatible to the stainless steel used in industrial reactors. These features are undesirable for use in commercial production.

Kim et al. have proposed in Chem. Commun., 2000, 1159–1160 to synthesize mesoporous silica materials using sodium metasilicate, hydrochloric acid and nonionic bloc copolymers as structure-directing agents. The mesoporous materials obtained were found to be of poor quality being irregular in shape and to exhibit broad pore size distributions and low surface areas.

SUMMARY OF THE INVENTION

It is therefore an object of the present invention to overcome the above drawbacks and to provide a method of preparing highly ordered mesoporous silica materials using low cost commercially available precursors.

In accordance with the invention, there is provided a method of preparing a highly ordered mesoporous silica material, comprising the steps of:

a) providing an aqueous solution of a nonionic surfactant;

b) adding an aqueous solution of sodium silicate to the solution of step (a) at a temperature of about 12° C. to about 28° C. with stirring for at least two hours to form a homogeneous solution;

c) adding a sulfuric acid solution at concentration of at least 80% to the homogenous solution obtained in step (b) with stirring to form a gel mixture;

d) aging the gel mixture obtained in step (c) by stirring the mixture at a temperature of at least 10° C. for a period of about 1 to 36 hours and subsequently heating the mixture for at least 24 hours at a temperature of at least 60° C. to increase silanol group condensation, thereby forming a solid precipitate;

e) recovering the precipitate obtained in step (d);

f) treating the precipitate with water at a temperature of about 60° C. to about 135° C. and at near neutral pH to remove residual surfactant and complete silanol group condensation; and g) calcining the treated precipitate to remove any remaining surfactant.

Applicant has found quite unexpectedly that highly ordered mesoporous silica materials can be prepared using sodium silicate as a silica source, sulfuric acid and nonionic surfactants such as poly(alkylene oxide) surfactants and amphiphilic mono-, di- and tribloc copolymers as structure-directing agents. The structure, mesopore size and surface area of mesoporous silica are controlled by the synthesis conditions and the surfactant species selected; each type of surfactant favors the formation of a specific meso-structured silica phase. In addition, substituents such as aluminum, titanium, vanadium etc. may also be incorporated into the silica framework of these materials for application in catalysis and ion exchange. Importantly, after calcination the mesoporous products are thermally stable in boiling water at least for 48 hours. Mesoporous silicate materials prepared by the method of the invention have uniform pore size, high surface areas and thicker mesopore walls (30–65 Å) than MCM-41™ synthesized by using conventional cationic surfactants (10–15 Å).

The aqueous surfactant solution of step (a) is advantageously prepared by dissolving the nonionic surfactant in water with stirring at a temperature of 25 to 45° C. for at least one hour, preferably at 35–40° C. for 2 hours. Examples of suitable nonionic surfactants include those sold under the trademarks BRIJ 56™ ($C_{16}H_{33}(OCH_2CH_2)_{10}OH$), BRIJ 58™ ($C_{16}H_{33}(OCH_2CH_2)_{20}OH$), BRIJ 76™ ($C_{18}H_{37}(OCH_2CH_2)_{10}OH$), PLURONIC P-123™ ($HO(CH_2CH_2O)_{20}(CH_2CH(CH_3)O)_{70}(CH_2CH_2O)_{20}H$) and PLURONIC F-127™ ($HO(CH_2CH_2O)_{106}(CH_2CH(CH_3)O)_{70}(CH_2CH_2O)_{106}H$). Sodium aluminate or other M-precursors (where M=Al, Fe, Ga, Ti, V, Zr, Nb, etc.) can be added to the aqueous solution of nonionic surfactant.

Step (b) can be generally carried out at ambient temperature under stirring for at least two hours.

The step (c) is preferably performed with a concentrated sulfuric acid solution (c-$H_2SO_4$, 98%) which is rapidly added to the homogeneous solution obtained in step (b) with vigourous stirring, thereby forming a gel mixture. Under strongly acidic conditions (pH<2, below the aqueous isoelectric point of silica), the formation of mesophase proceeds through counter ion mediated interactions (hydrogen bond or van der Waals interactions) of the form ($S^0H^+$)($X^-I^+$); where $S^0$: nonionic surfactant; $H^+$: proton; $X^-$: acid anion (such as $Cl^-$, $Br^-$, $I^-$, $F^-$, $SO_4^{2-}$); and $I^+$: protonated silicic acid. By using. $H_2SO_4$ instead of HCl, because the $SO_4^{2-}$ anions are coordinated directly to the silicon atom at the surfactant-silica interface through expansion of the silicon atom's coordination sphere, they provide sufficient electrostatic shielding and effective hydrogen bonding to create highly ordered structures. The radius or charge of the acid anion and the strength of acid play an important role in the assembly of organic-inorganic mesophase products.

The gel mixture is preferably aged in step (d) by stirring the mixture at ambient temperature for 12 to 24 hours and subsequently heating same for about 24 hours at different temperatures between 60 and 150° C., e.g. 80, 100 and 135° C., in an oven to increase the degree of silanol group condensation, thereby forming a solid precipitate.

The precipitate which is recovered in step (e) is treated with distilled water. Since the mesoporous solids are synthesized in strong acid media, the strong acid synthesis conditions limit framework crosslinking (degree of silanol group condensation) and structural stability. The surface wall is still poorly condensed. Therefore, in step (f), the precipitate is treated with hot water (60–135° C.) at near neutral pH (above the isoelectric silica point) in order to complete silanol group condensation and to remove residual surfactant (template). Preferably, step (f) is carried out with hot water at 80° C. and near neutral pH, for about 24 hours. The method of the invention combines the advantages of the formation of highly ordered materials in strong acid media and the complete crosslinking of the silicate at neutral pH.

In step (g), the calcination of the precipitate is effected to remove any remaining surfactant. Such a step is generally carried out at a temperature ranging from 400 to 650° C., preferably 500–550° C., in air for at least 6 hours. After calcination, the mesoporous silica material is thermally stable in boiling water at least for 48 hours.

The silica materials prepared according to the method of the present invention may be used in the synthesis of a new type of materials combining some of the properties of mesoporous molecular sieves and zeolites. These materials overcome the limitations of both zeolites and mesoporous molecular sieves and are considered of great potential interest in catalysis and separation applications.

The following non-limiting examples illustrate the invention.

EXAMPLE 1

Preparation of Highly Ordered Mesoporous Materials

This example illustrates the preparations of highly ordered mesoporous materials with a pore diameter of about 30 Å at room temperature using sodium silicate solution (28.7% $SiO_2$, 8.9% $Na_2O$) as silicon source, sulfuric acid (98%) and BRIJ 56™ ($C_{16}H_{33}(OCH_2CH_2)_{10}OH$) as the structure-directing agent. 16 g of BRIJ 56™ was dissolved in 380 g of distilled water at 35–40° C. for 2 hours, giving a clear aqueous solution and then 37 g of sodium silicate solution was added at room temperature with magnetic stirring. The mixture is kept stirred for 1–2 hours. To this mixture, 48 g of $H_2SO_4$ (98%) was quickly added with vigorous mechanic stirring. The resulting gel mixture was stirred for 18 hours and subsequently heated for 48 hours at 80° C. in an oven to increase the degree of silanol group condensation. The product was filtered, and washed with distilled water. To remove a fraction of template and complete condensation, the solid product was then treated in 380 g of distilled water at 80° C. for 24 hours. Finally, the product was filtered, washed and dried in an oven and calcined in air under static conditions at 550° C. for 6 hours.

Figure 1:
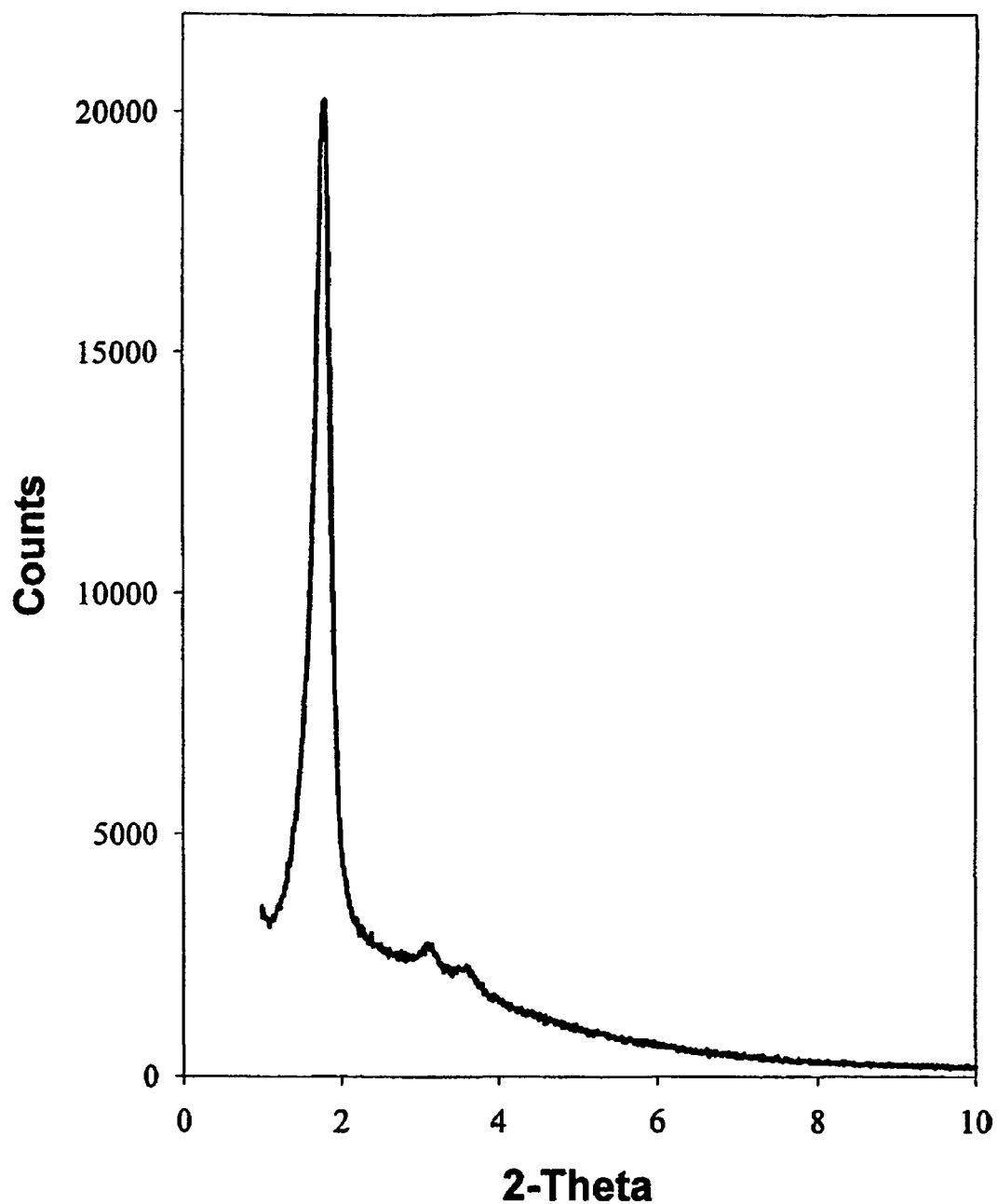
FIG. 1 shows the XRD pattern of a calcined mesoporous silica material prepared with BRIJ56™.
Figure 2:
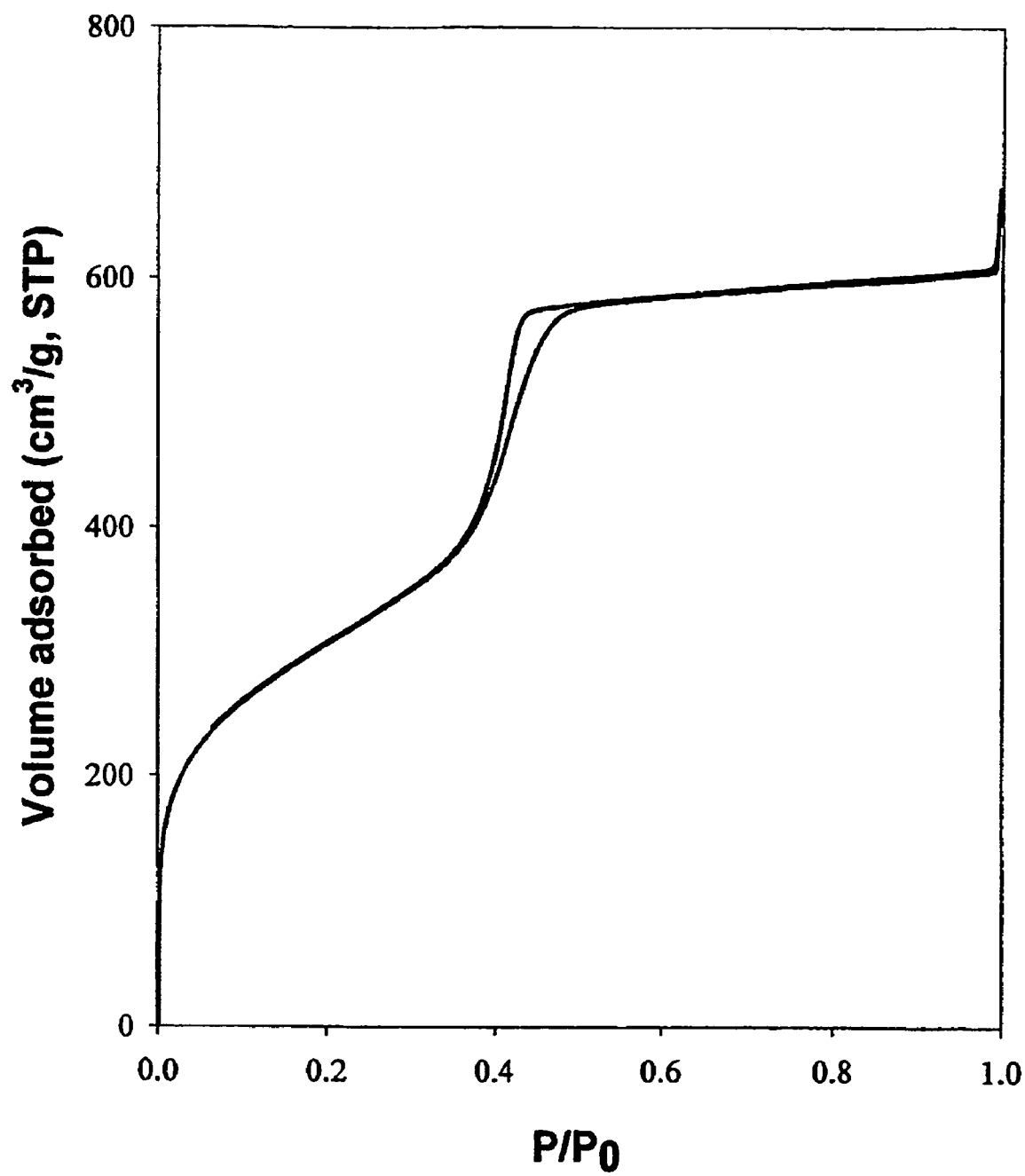
FIG. 2 shows the $N_2$ adsorption/desorption isotherms at 77 K for the calcined mesoporous silica material prepared with BRIJ56™.
Figure 3:
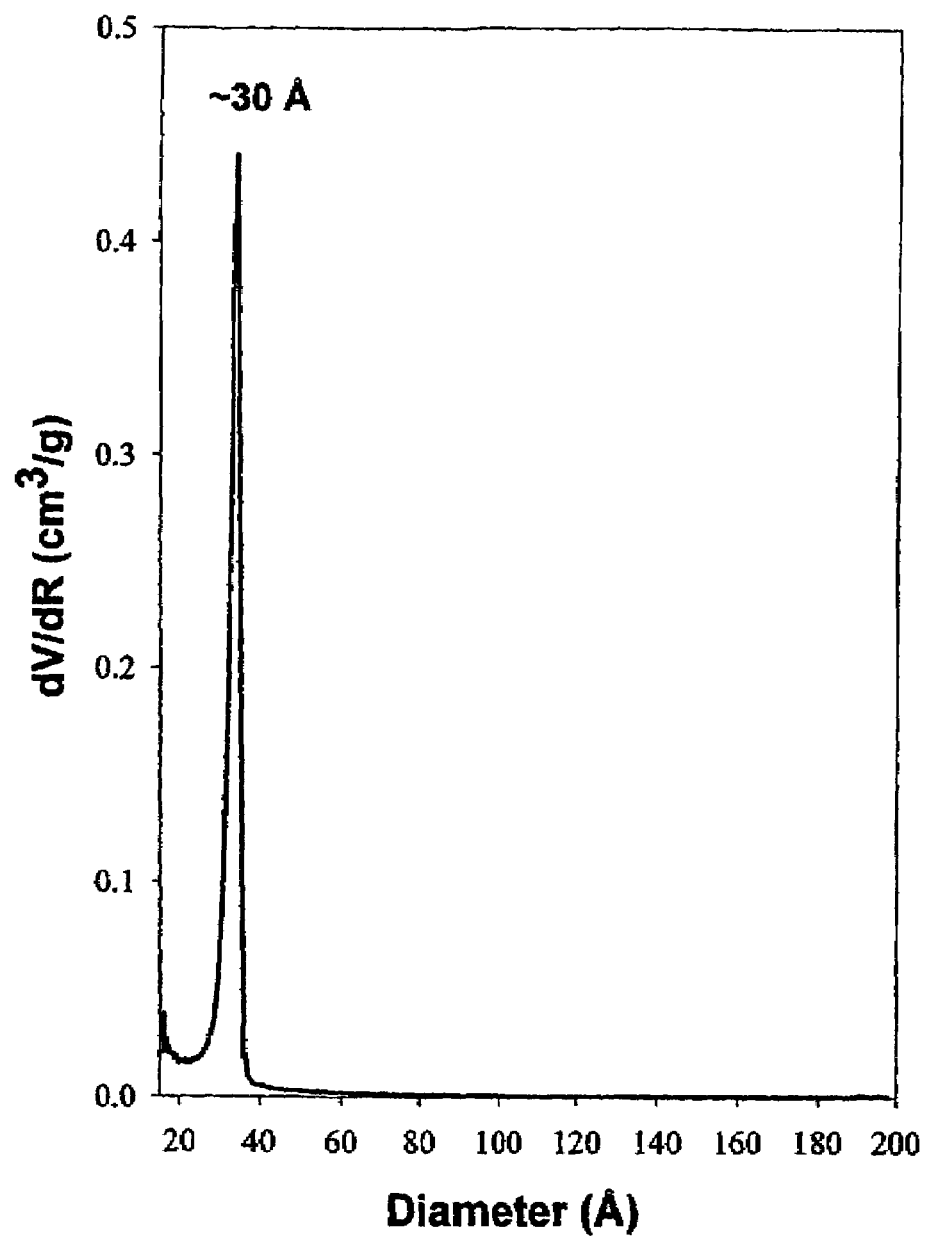
FIG. 3 illustrates the BJH pore radius distribution calculated from the desorption branch of the isotherm for the calcined mesoporous silica material prepared with BRIJ56™.

The product has characteristics, which are demonstrated by X-ray diffraction, transmission electron microscopy (TEM) and $N_2$ adsorption/desorption isotherms. FIG. 1 shows the powder X-ray diffraction (XRD) pattern for this material after calcination. The XRD spectrum exhibits a very intense diffraction peak and two or more weak peaks, which are characteristic of a hexagonal structure. $N_2$ adsorption/desorption isotherms and BJH pore size distribution calculated from the desorption branch of the $N_2$ isotherms for this calcined material are shown in FIGS. 2 and 3.

The pore size distribution is very narrow with a pore diameter of about 30 Å, indicating excellent textural uniformity of the material. The pore volume is 1.1 $cm^3g^{-1}$ and the BET surface area is 1150 $m^3g^{-1}$ for this materials (Table 1). The TEM image also indicates that this material has highly ordered hexagonal structure and even higher quality than that of similar materials obtained from much more expensive tetraethyl orthosilicate (TEOS).

TABLE 1

Characterization of the materials prepared with different surfactants

| Sample | Surfactant | Treatment time (hours) | Temperature (° C.) | Mesophase | $S_{BET}$ ($m^2$/g) | Pore diameter (Å) |
|---|---|---|---|---|---|---|
| 1 | BRIJ56 | 48 | 80 | hexagonal | 1140 | 30 |
| 2 | PLURONIC F127 | 48 | 80 | cubic | 845 | 40 |
| 3 | PLURONIC P123 | 48 | 80 | hexagonal | 840 | 72 |

EXAMPLE 2

Preparation of Mesoporous Materials Using Different Surfactants

Figure 4:
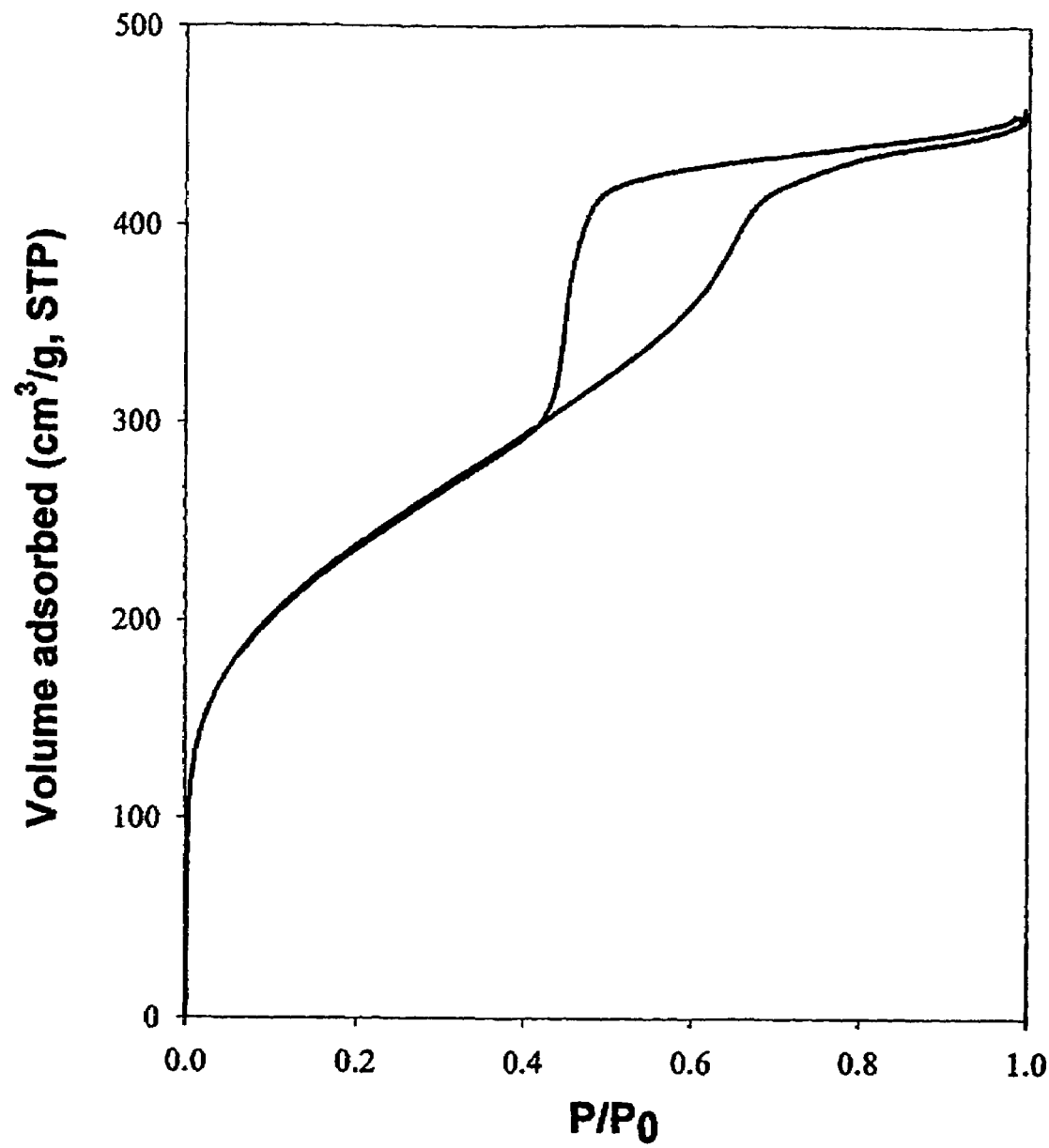
FIG. 4 shows the $N_2$ adsorption/desorption isotherms at 77 K for a calcined mesoporous silica material prepared with PLURONIC F127™.
Figure 5:
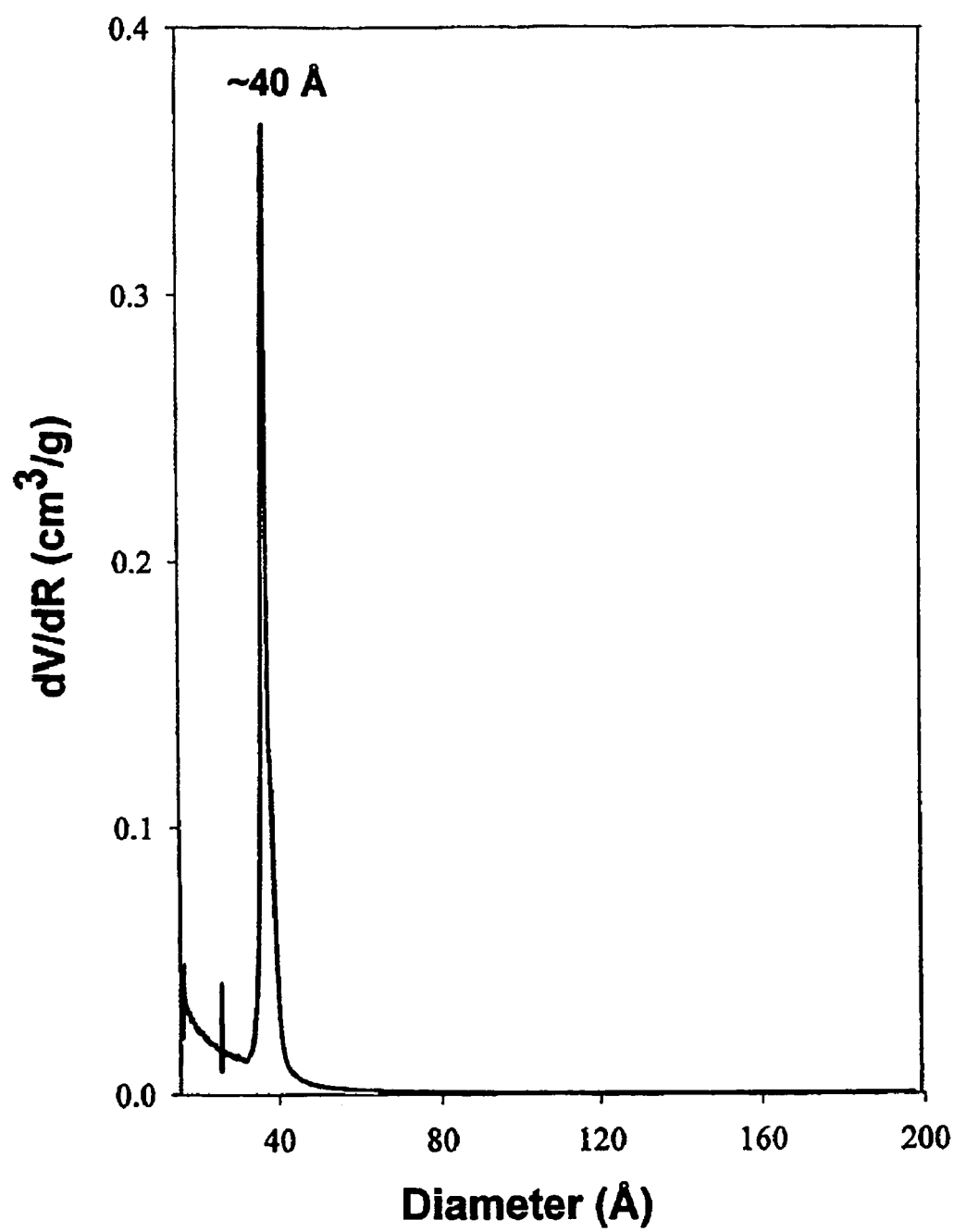
FIG. 5 illustrates the BJH pore radius distribution calculated from the desorption branch of the isotherm for the calcined mesoporous silica material prepared with PLURONIC F127™.
Figure 6:
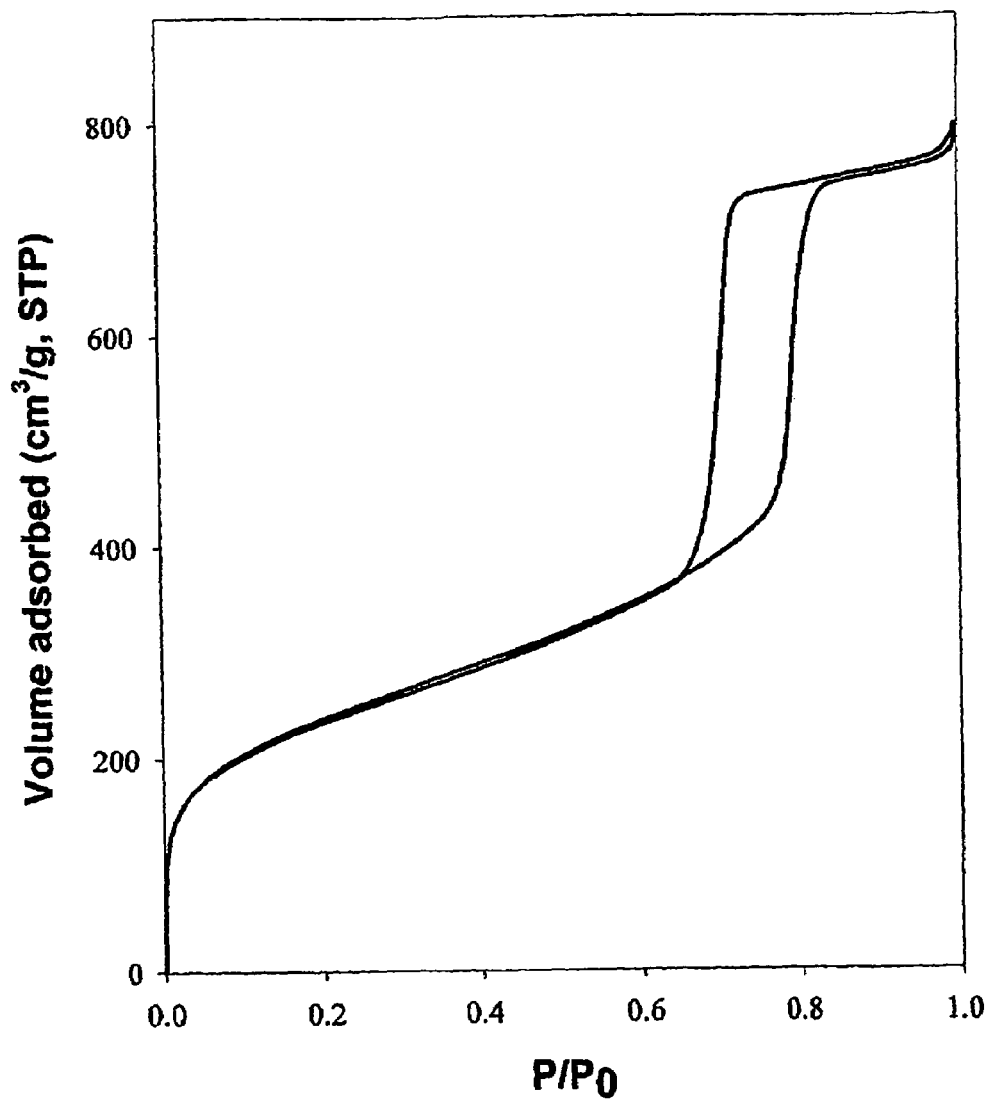
FIG. 6 shows the $N_2$ adsorption/desorption isotherms at 77 K for a calcined mesoporous silica material prepared with PLURONIC P123™.
Figure 7:
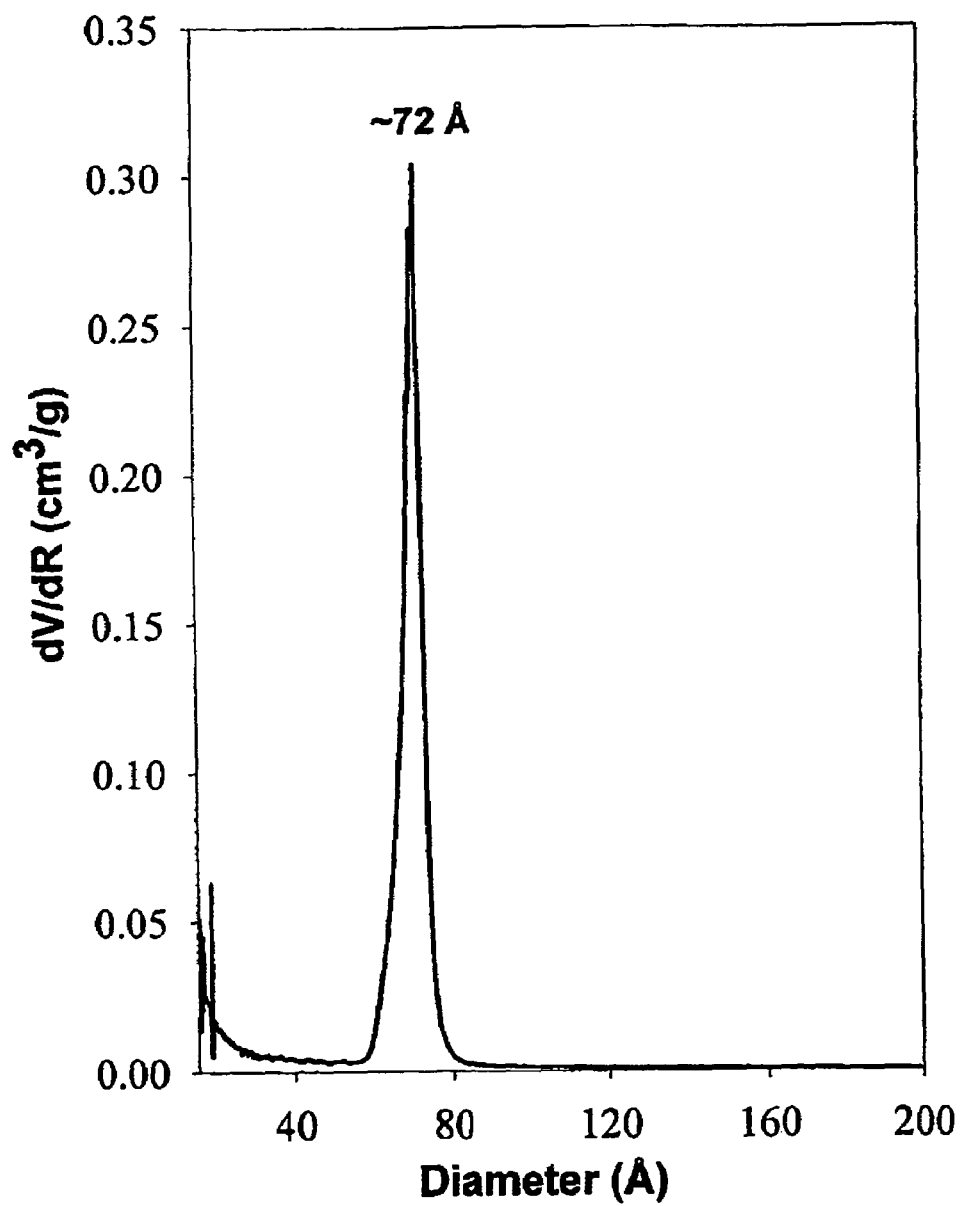
FIG. 7 illustrates the BJH pore radius distribution calculated from the desorption branch of the isotherm for the calcined mesoporous silica material prepared with PLURONIC P123™.
Figure 8A:
FIGS. 8a and 8b show TEM images of calcined mesoporous silica materials prepared with BRIJ56™ and treated at different temperatures: A) 80° C. and B) 135° C.
Figure 8B:
Figure 9A:
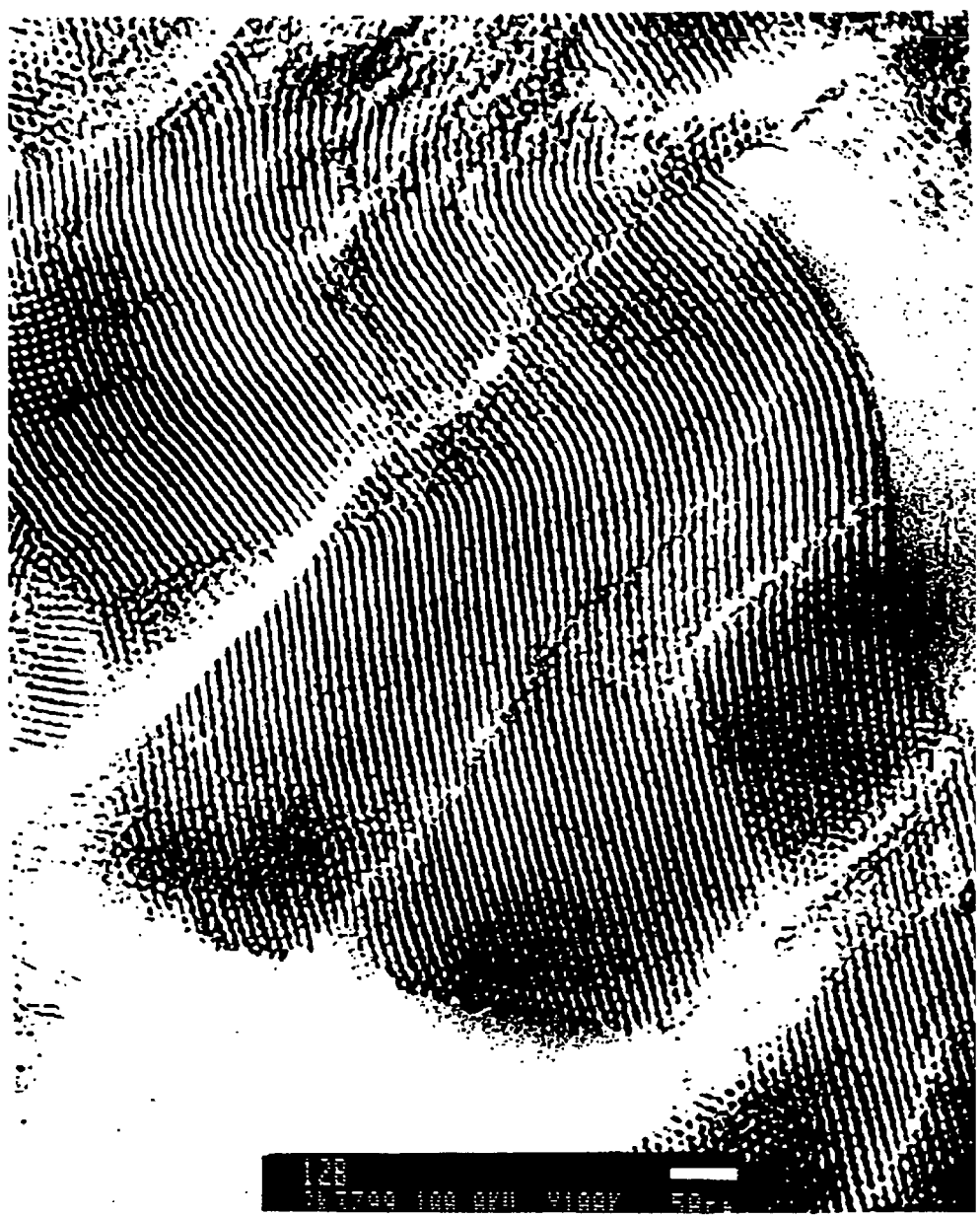
FIGS. 9a and 9b show TEM images of calcined mesoporous silica materials prepared with PLURONIC P123™ and treated at different temperatures: A) 80° C. and B) 135° C.
Figure 9B:
Figure 10:
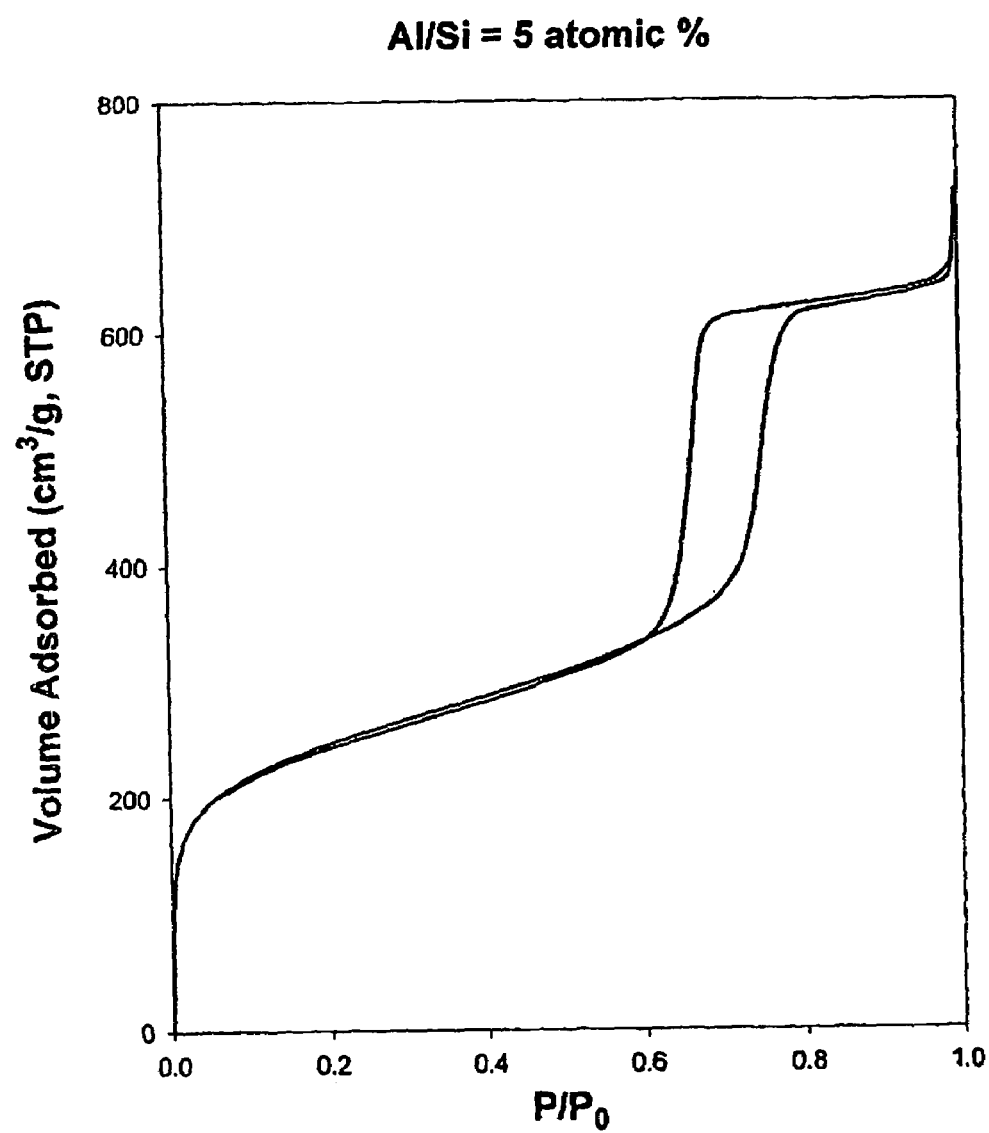
FIG. 10 shows the $N_2$ adsorption/desorption isotherms at 77 K for a calcined alumino-silicate (Al/Si=5 atomic %) material prepared with PLURONIC P123™.
Figure 11:
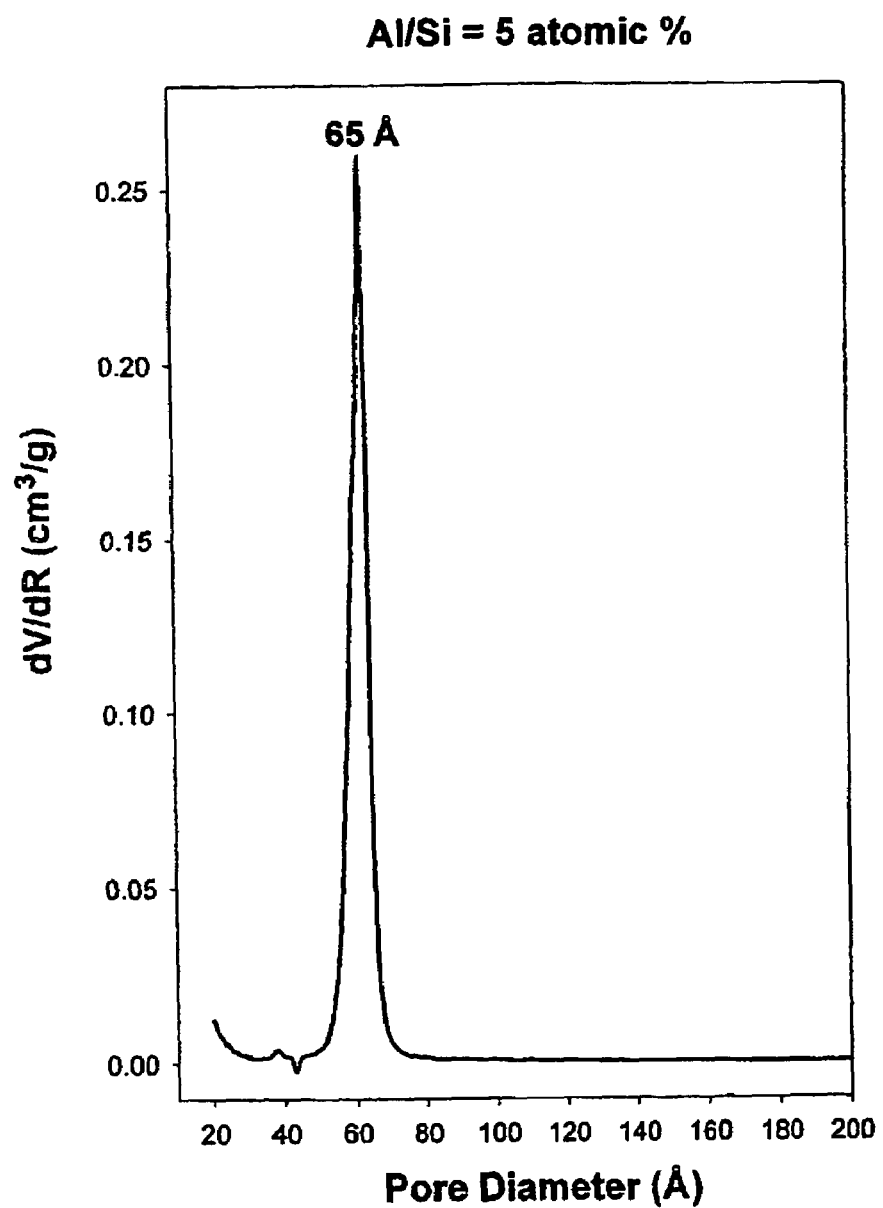
FIG. 11 illustrates the BJH pore diameter distribution calculated from the desorption branch of the isotherm for the calcined alumino-silicate (Al/Si=5 atomic %) material prepared with PLURONIC F123™.
Figure 12:
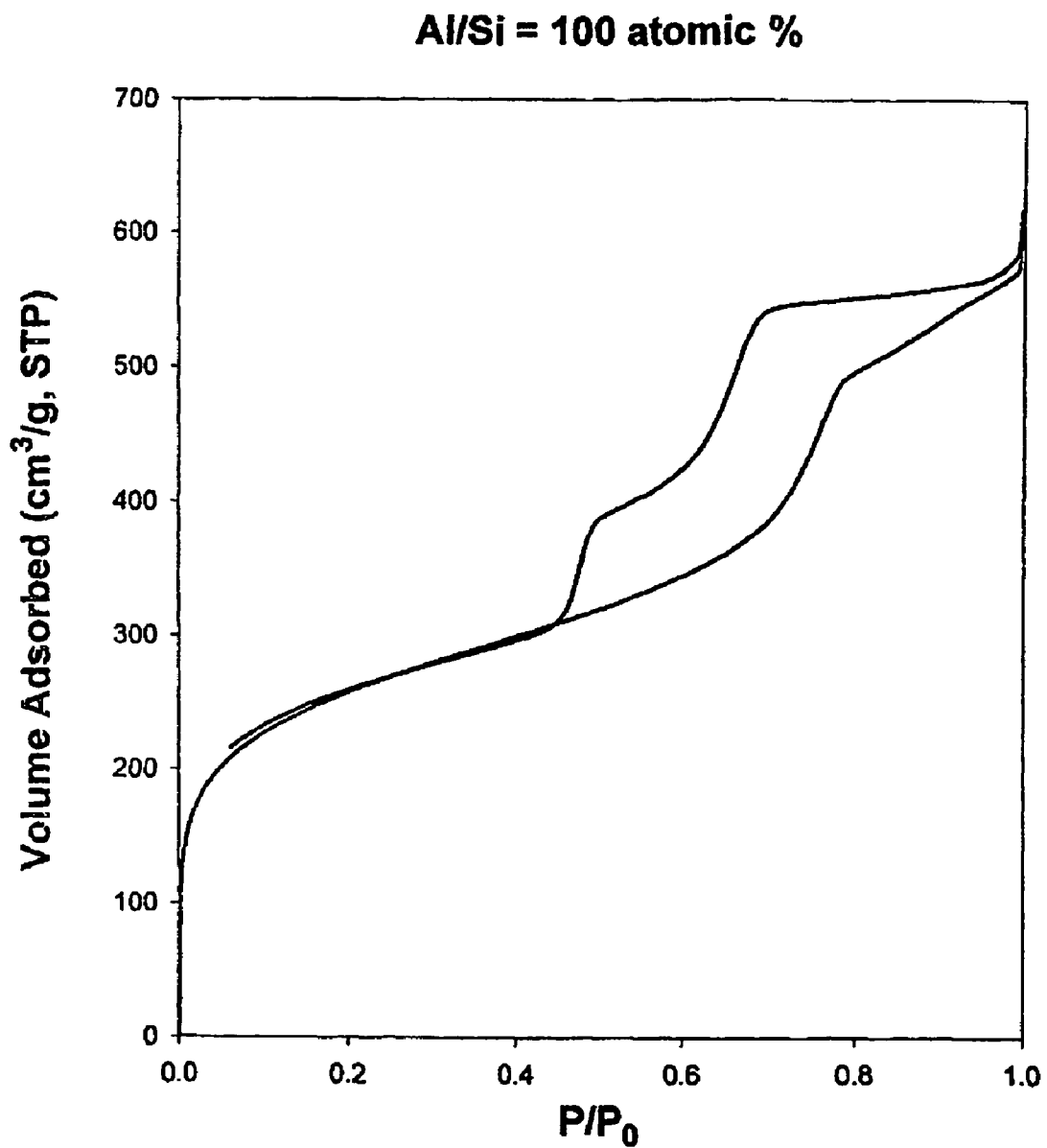
FIG. 12 shows the $N_2$ adsorption/desorption isotherms at 77 K for a calcined alumino-silicate (Al/Si=100 atomic %) material prepared with PLURONIC P123™.
Figure 13:
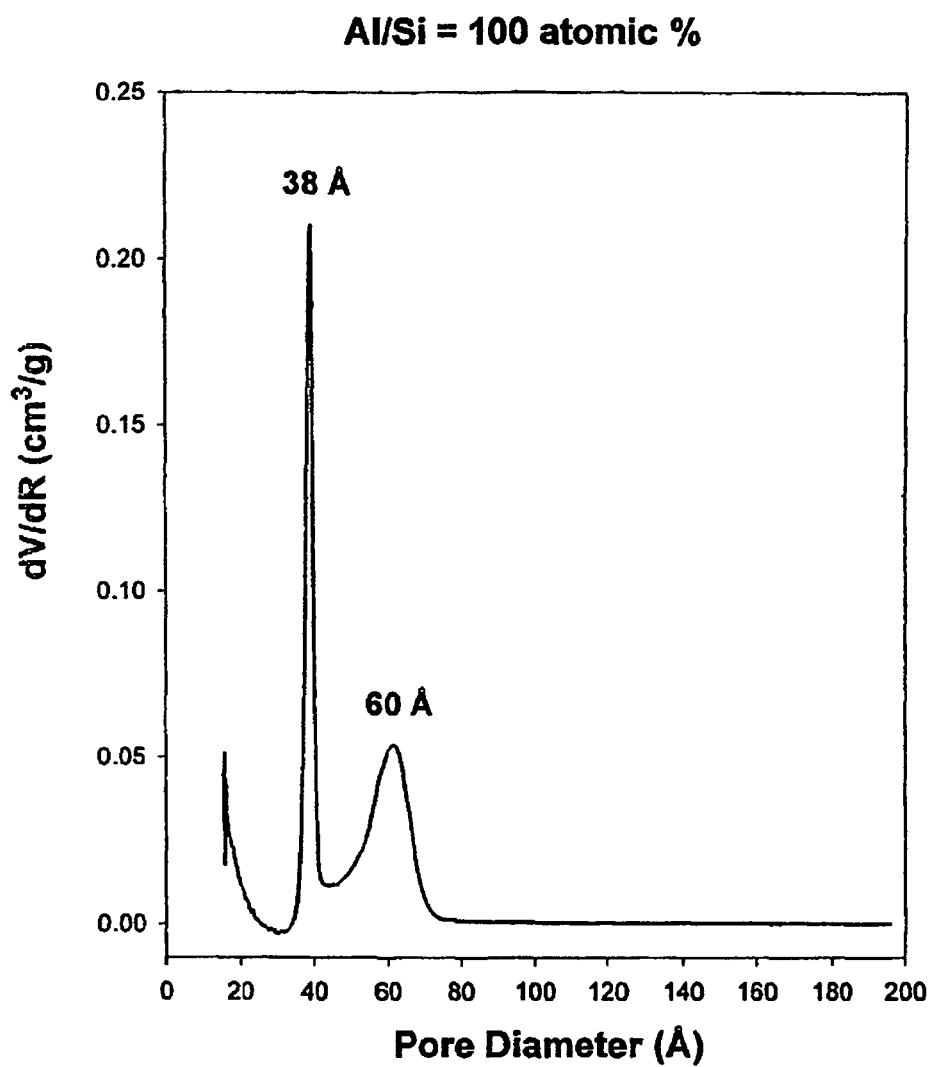
FIG. 13 illustrates the BJH pore diameter distribution calculated from the desorption branch of the isotherm for a calcined alumino-silicate (Al/Si=50 atomic %) material prepared with PLURONIC F123™.
Figure 14:
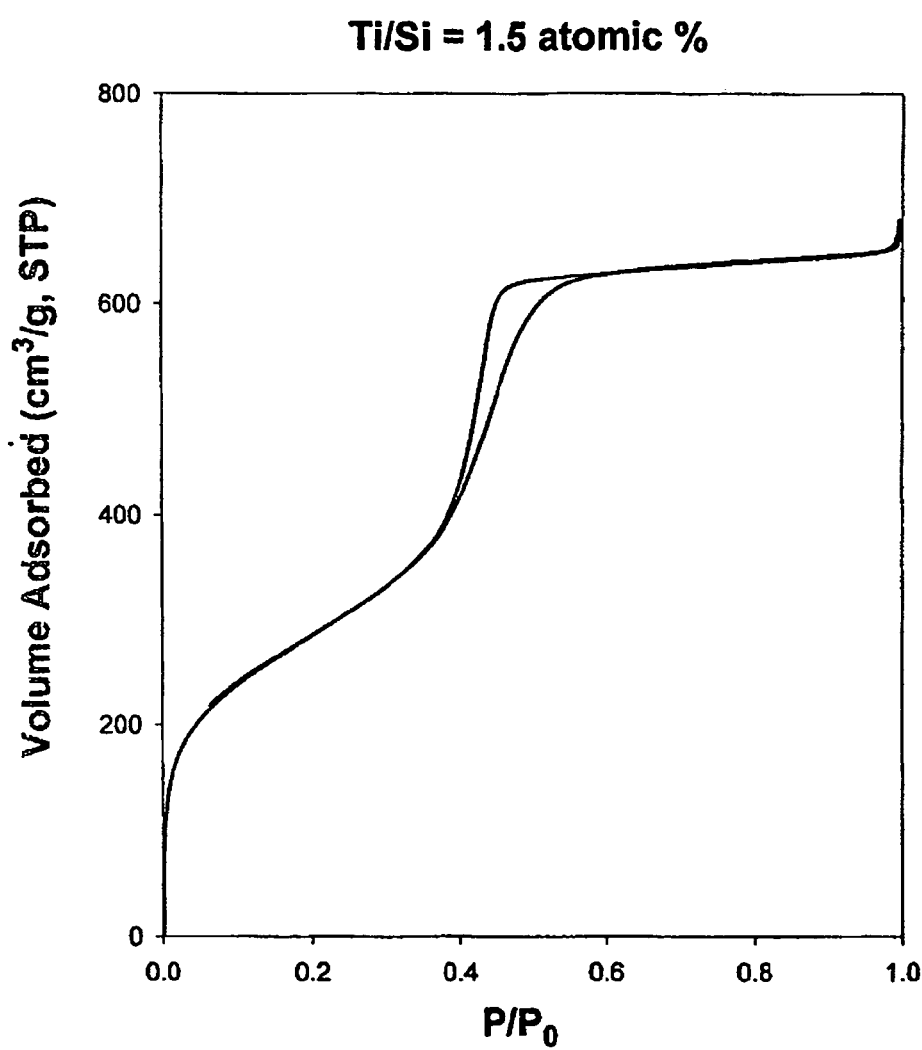
FIG. 14 shows the $N_2$ adsorption/desorption isotherms at 77 K for a calcined titano-silicate (Ti/Si=1.5 atomic %) material prepared with BRIJ56™.
Figure 15:
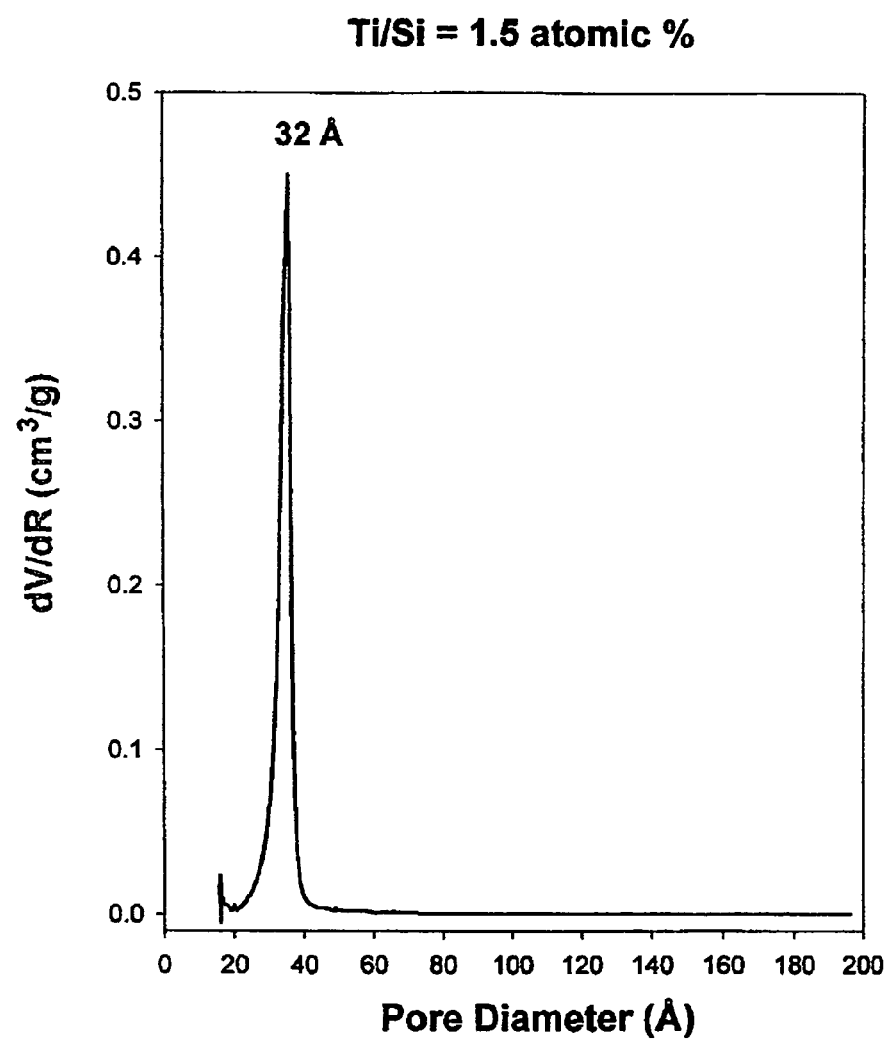
FIG. 15 illustrates the BJH pore diameter distribution calculated from the desorption branch of the isotherm for the calcined titano-silicate (Ti/Si=1.5 atomic %) material prepared with BRIJ56™.
Figure 16:
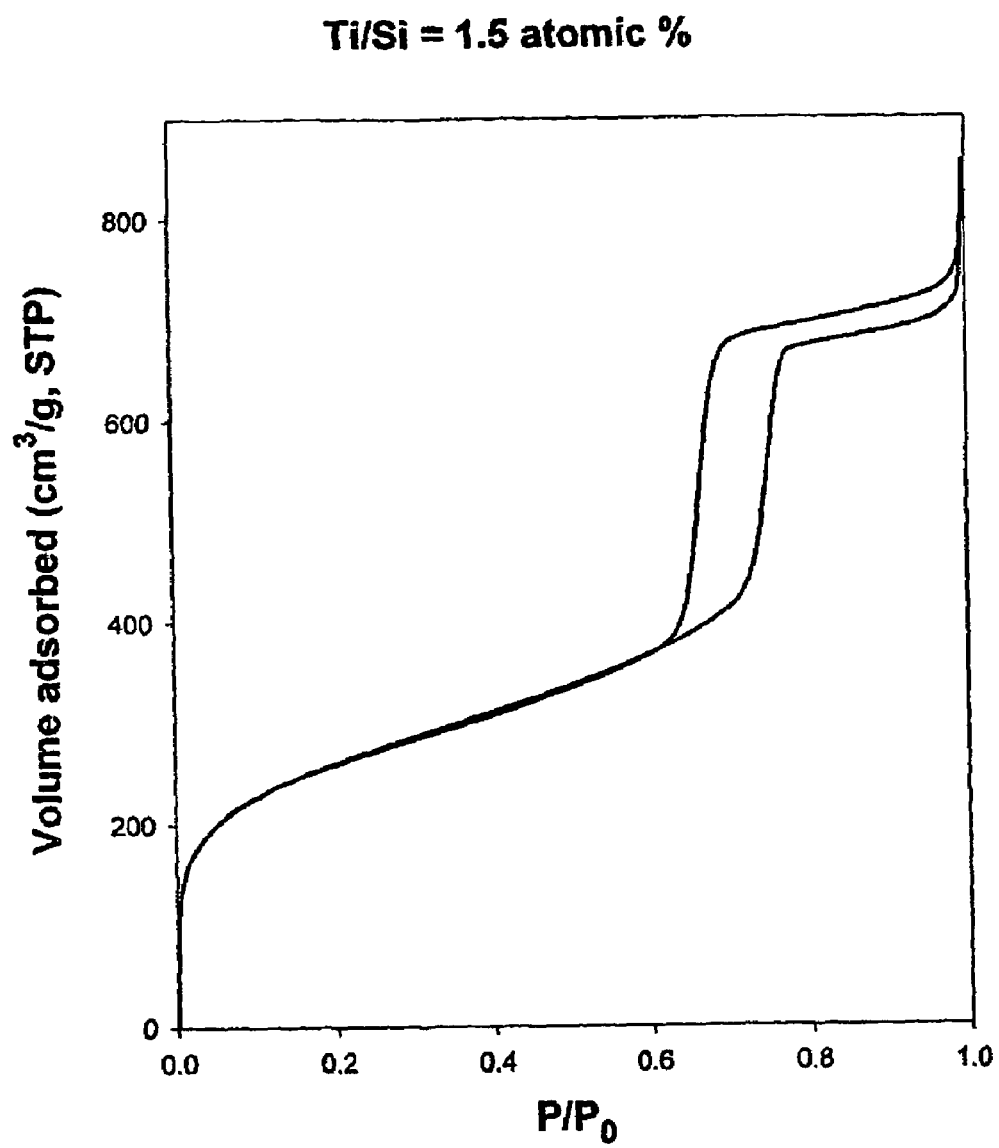
FIG. 16 shows the $N_2$ adsorption/desorption isotherms of nitrogen at 77 K for the calcined titano-silicate (Ti/Si=1.5 atomic %) material prepared with PLURONIC 123™.
Figure 17:
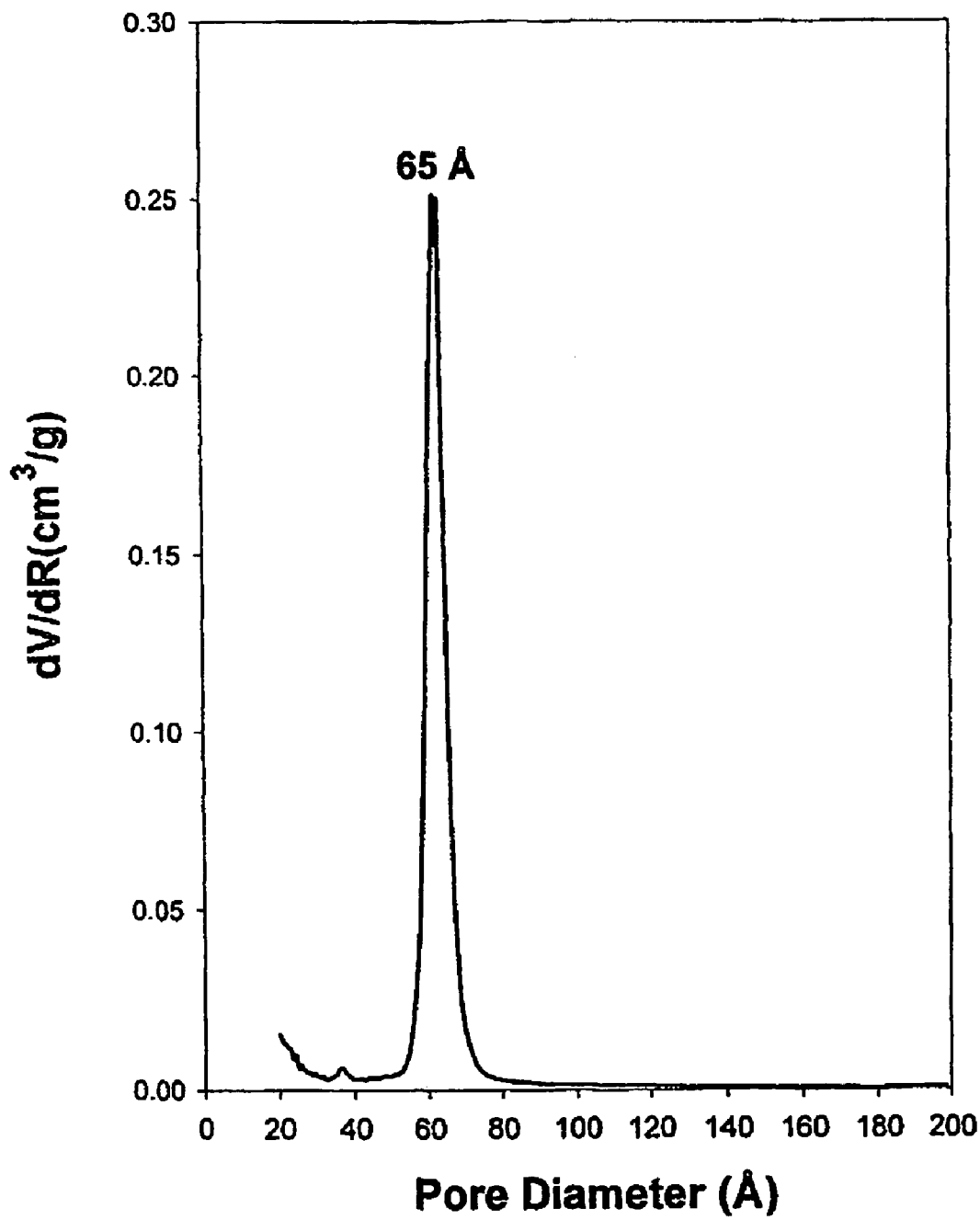
FIG. 17 illustrates the BJH pore diameter distribution calculated from the desorption branch of the isotherm for the calcined titano-silicate (Ti/Si=1.5 atomic %) material prepared with PLURONIC 123™.
Figure 18:
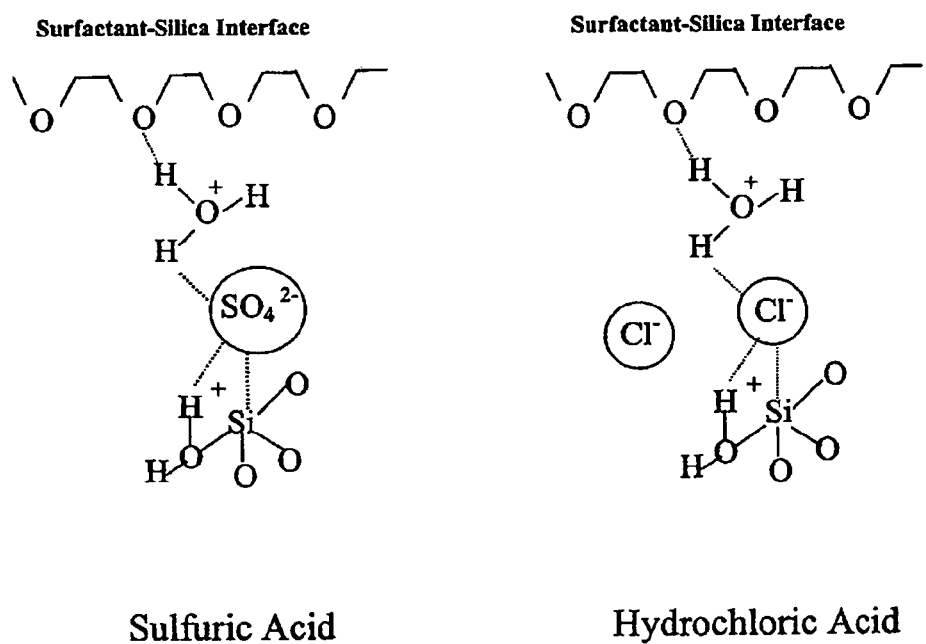
FIG. 18 illustrates the atomic differences between sulfuric acid and hydrochloric acid.

Other examples of such materials were prepared operating under the same conditions described in Example 1, except that the BRIJ 56™ surfactant was replaced by the surfactant PLURONIC F127™ or PLURONIC P123™. The XRD pattern of the material prepared with PLURONIC P123™ shows a very intense peak along with two or more weak peaks which are characteristic of a hexagonal structure. However, the XRD pattern of the material prepared with PLURONIC F127™ exhibits a cubic structure. FIGS. 4 and 6 illustrate the $N_2$ adsorption/desorption isotherms for the calcined materials obtained from PLURONIC F127™ and PLURONIC P123™, respectively. A typical type IV adsorption isotherm with an irreversible $H_1$ hysteresis loop is observed as expected for a large pore material. The step-like uptake of $N_2$ in the P/P0 range 0.4–0.7 corresponds to capillary condensation within framework pores with a BJH diameter of about 40 and about 72 Å; and a BET surface area of 845 and 840 $m^2g^{-1}$ for the materials prepared with PLURONIC F127™ and PLURONIC P123™ surfactants, respectively (FIGS. 5, 7 and Table 1).

TABLE 2

Characterization of the materials treated at different temperatures

| Sample | Surfactant | Treatment time (hours) | Temperature (° C.) | Mesophase | $S_{BET}$ ($m^2$/g) | Pore diameter (Å) |
|---|---|---|---|---|---|---|
| 1 | BRIJ56 | 24 | 80 | hexagonal | 1090 | 28 |
| 2 | | 24 | 100 | | 1150 | 32 |
| 3 | | 24 | 135 | | 950 | 56 |
| 4 | PLURONIC P123 | 24 | 80 | hexagonal | 740 | 53 |
| 5 | | 24 | 100 | | 870 | 58 |
| 6 | | 24 | 135 | | 655 | 102 |

The TEM images for the hexagonal and cubic materials (materials prepared with PLURONIC P123™ and PLURONIC F127™, respectively) show well-ordered structures suggesting that both mesoporous silica materials have highly ordered structures.

EXAMPLE 3

Effect of Heating Temperature During Aging

Operating exactly as in Example 1, except that the resulting gel mixtures after adding sulfuric acid and aging with stirring at ambient temperature for 18 hours were subsequently heated for 24 hours at 80, 100 and 135° C. in an oven in order to control the pore size, surface area. Two series of materials were prepared: the first one was prepared with BRIJ56 and the second one with PLURONIC P123™. The XRD patterns of these materials show that all materials exhibit well-defined reflections which are characteristic of hexagonal structure. This indicates a high uniformity of the materials. The TEM images of these samples are also shown in FIGS. 8a, 8b, 9a and 9b indicating that the materials have highly ordered hexagonal structures. The $N_2$ adsorption/desorption isotherms show very high surface areas and pore size distribution are very narrow. The pore diameter and BET surface area varied depending on the treatment temperature. Table 2 summarizes the pore diameter and BET surface area of these samples.

EXAMPLE 4

Variation of Reagents in the Synthesis of Mesoporous Materials

This example illustrates the preparations of highly ordered mesoporous alumino-silicate in which the atomic ratios of the reagent (expressed as Al/Si) were varied from 1.0 to 20 atom %. For the material (Al/Si=10 atomic %), 16 g of BRIJ 56™ was dissolved in 320 g of distilled water at 35–40° C. for 2 hours, giving a clear aqueous solution. 34.3 g of sodium silicate solution (28.7% $SiO_2$, 8.9% $Na_2O$) was added and then a clear solution of 1.93 g of sodium aluminate (46.78% $Al_2O_3$, 28.43% $Na_2O$) in 50 g of distilled water was also added at room temperature with magnetic stirring. The mixture is kept stirring for 1–2 hours. To this mixture, 48 g of $H_2SO_4$ (98%) was quickly added with vigorous mechanic stirring. The resulting gel mixture was stirred for 18 hours at room temperature and subsequently heated for 24 hours at 80° C. in an oven to increase the degree of silanol group condensation. The product was filtered, and washed with distilled water. To remove a fraction of template, the solid product was then treated in 380 g of distilled water at 80° C. for 24 hours. Finally, the product was filtered, washed and dried in an oven and calcined in air under static conditions at 550° C. for 6 hours. The materials are characterized by the XRD, transmission electron microscopy (TEM), $N_2$ adsorption/desorption isotherms and $^{27}Al$ MAS NMR techniques (Table 3). The results indicate that the material has a highly ordered mesoporous structure. The $^{27}Al$ MAS NMR spectra exhibit a resonance centered at 53 ppm which is characteristic of tetrahedral aluminum.

TABLE 3

Characterization of the mesoporous alumino-silicates prepared using PLURONIC-P123 as a surfactant with various aluminum percentages

| Sample | Al/Si (atom %) | Treatment time (hours) | Temperature (° C.) | Mesophase | $S_{BET}$ ($m^2/g$) | Pore diameter (Å) |
|---|---|---|---|---|---|---|
| 1 | 5 | 48 | 80 | hexagonal | 885 | 65 |
| 2 | 10 | 48 | 80 | hexagonal | 845 | 60 |
| 3 | 100 | 48 | 80 | hexagonal | 925 | 38, 60 |

EXAMPLE 5

Preparation of Highly Ordered Mesoporous Titano-silicate

This example illustrates the preparations of highly ordered mesoporous titano-silicate in which the atomic ratios of the reagent (expressed as Ti/Si) were varied from 0.5 to 5.0 atom %. Table 4 shows the characterization of the mesoporous titano-silicates prepared with Ti/Si=1.5 atomic %.

TABLE 4

Characterization of the mesoporous titano-silicates prepared with Ti/Si = 1.5 atomic %

| Sample | Surfactant | Treatment time (hours) | Temperature (° C.) | Mesophase | $S_{BET}$ ($m^2/g$) | Pore diameter (Å) |
|---|---|---|---|---|---|---|
| 1 | BRIJ56 | 24 | 100 | hexagonal | 1035 | 32 |
| 2 | PLURONIC 123 | 24 | 100 | hexagonal | 925 | 65 |

Operating exactly as in Example 4, except that tetraethoxide titanium was used instead of sodium aluminate. $N_2$ adsorption/desorption isotherms of these samples are representative of highly ordered mesoporous materials. The FTIR spectra of these samples show a band at 960 $cm^{-1}$, which are characteristic of titanium framework. The band at 960 $cm^{-1}$ is essentially not present in the pure silicate. The UV-visible spectra exhibit a single peak band at 230 nm. No band at 330 nm characteristic of octeherdal extra-framework was observed suggesting that all titanium ions were essentially incorporated in the silica framework.

We claim:

1. A method for preparing a mesoporous silica material comprising the steps of:
   a) providing an aqueous solution of a non-ionic surfactant;
   b) adding an aqueous solution of sodium silicate solution to the solution of step (a) at a temperature of about 12° C. to about 28° C. with stirring for at least two hours to form a homogeneous solution;
   c) adding a sulphuric acid solution at concentration of at least 80% by weight to the homogeneous solution obtained in step (b) with stirring to form a gel mixture;
   d) aging the gel mixture obtained in step (c) by stirring the mixture at a pH lower than 2 and at a temperature of at least 10° C. for a period of about 1 to 36 hours and subsequently heating the mixture for at least 24 hours at a temperature of at least 60° C. to increase silanol group condensation, thereby forming a solid precipitate;
   e) recovering the precipitate obtained in step (d);
   f) treating the precipitate recovered in step (e) with water at a temperature of about 60° C. to about 135° C. and at about neutral pH to remove residual surfactant and complete silanol group condensation; and
   g) calcining said treated precipitate of step (f) to remove any remaining surfactant.

2. A method as claimed in claim 1, wherein said nonionic surfactant is selected from the group consisting of poly (alkylene oxide) surfactants and amphiphilic block copolymers.

3. A method as claimed in claim 2, wherein said surfactant is selected from the group consisting of $(C_{16}H_{33}(OCH_2CH_2)_{10}OH)$, $(C_{16}H_{33}(OCH_2CH_2)_{20}OH)$, $(C_{18}H_{37}(OCH_2CH_2)_{10}OH)$, $(HO(CH_2CH_2O)_{20}(CH_2CH(CH_3)O)_{70}(CH_2CH_2O))$, and $(HO(CH_2CH_2O)_{106}(CH_2CH(CH_3)O)_{70}(CH_2CH_2O)_{106}H)$.

4. A method as claimed in claim 1, wherein an aqueous solution of sodium aluminate is added to the solution of step (a) with stirring.

5. A method as claimed in claim 1, wherein the gel mixture is stirred in step (d) at ambient temperature for 12 to 24 hours.

6. A method as claimed in claim 5, wherein the gel mixture is heated for about 24 hours at a temperature between 60 and 150° C.

7. A method as claimed in claim 1, wherein the precipitate is treated in step (f) with water at 80° C. and about neutral pH for about 24 hours.

8. A method as claimed in claim 1, wherein step (g) is carried out at a temperature of about 400° C. to about 650° C.

* * * * *